United States Patent
Morris et al.

(10) Patent No.: US 7,845,362 B2
(45) Date of Patent: Dec. 7, 2010

(54) WASHER FLUID SYSTEM FOR FUEL CELL VEHICLES

(75) Inventors: Steven E. Morris, Fair Haven, MI (US); Kevin G. Kolpasky, Oakland Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 601 days.

(21) Appl. No.: 11/679,195

(22) Filed: Feb. 27, 2007

(65) Prior Publication Data

US 2008/0206604 A1  Aug. 28, 2008

(51) Int. Cl.
B08B 3/00 (2006.01)
B08B 3/04 (2006.01)
B08B 9/00 (2006.01)
B08B 3/12 (2006.01)
B08B 6/00 (2006.01)

(52) U.S. Cl. ........................ 134/123; 134/184; 134/198
(58) Field of Classification Search ................ 134/198, 134/123, 184
See application file for complete search history.

(56) References Cited

U.S. PATENT DOCUMENTS

| | | | | |
|---|---|---|---|---|
| 3,738,575 A | * | 6/1973 | Somer | 239/284.1 |
| 4,407,643 A | | 10/1983 | Brown | |
| 5,141,160 A | * | 8/1992 | Waters | 239/284.1 |
| 5,303,649 A | * | 4/1994 | Reder et al. | 101/363 |
| 5,327,613 A | * | 7/1994 | Ohtsu | 15/250.02 |
| 5,593,290 A | | 1/1997 | Greisch et al. | |
| 5,651,259 A | * | 7/1997 | Twyman | 62/93 |
| 5,669,986 A | * | 9/1997 | Buchanan et al. | 134/42 |
| 5,946,763 A | * | 9/1999 | Egner-Walter et al. | 15/250.02 |
| 6,024,803 A | * | 2/2000 | Buchanan et al. | 134/42 |
| 6,065,863 A | * | 5/2000 | Cain | 366/163.2 |
| 6,206,644 B1 | | 3/2001 | Pereira et al. | |
| 6,237,627 B1 | * | 5/2001 | Boule | 137/571 |
| 6,290,599 B1 | | 9/2001 | Eis et al. | |
| 6,467,698 B2 | * | 10/2002 | Gaarder et al. | 237/12.3 B |
| 6,561,209 B2 | * | 5/2003 | Wojan et al. | 137/79 |
| 6,601,733 B1 | | 8/2003 | Schnacky et al. | |

FOREIGN PATENT DOCUMENTS

| | | | |
|---|---|---|---|
| FR | 2402582 A1 | | 4/1979 |
| JP | 2004311106 A | * | 11/2004 |
| JP | 2005108529 A | * | 4/2005 |

OTHER PUBLICATIONS

JP 2004-311106 Machine Translation.*

* cited by examiner

*Primary Examiner*—Michael Barr
*Assistant Examiner*—Charles W Kling

(57) ABSTRACT

A washer fluid system provides washer fluid by blending concentrated washer fluid with waste water produced in the operation of a fuel cell. The concentrated washer fluid is stored in a replenishable container. A mixing pump automatically meters the appropriate ratio of concentrated washer fluid to water (i.e., 1:10), preferably by a dual chamber arrangement, wherein the waste water from the fuel cell and the concentrated washer fluid are drawn from their respective sources and mixed, creating a mixed washer fluid having the proper ratio of water to washer fluid concentrate. In a first embodiment, the system creates the mixed washer fluid in real-time on demand of the wiper system; in a second embodiment a storage reservoir holds mixed washer fluid for standby use of the wiper system.

14 Claims, 5 Drawing Sheets

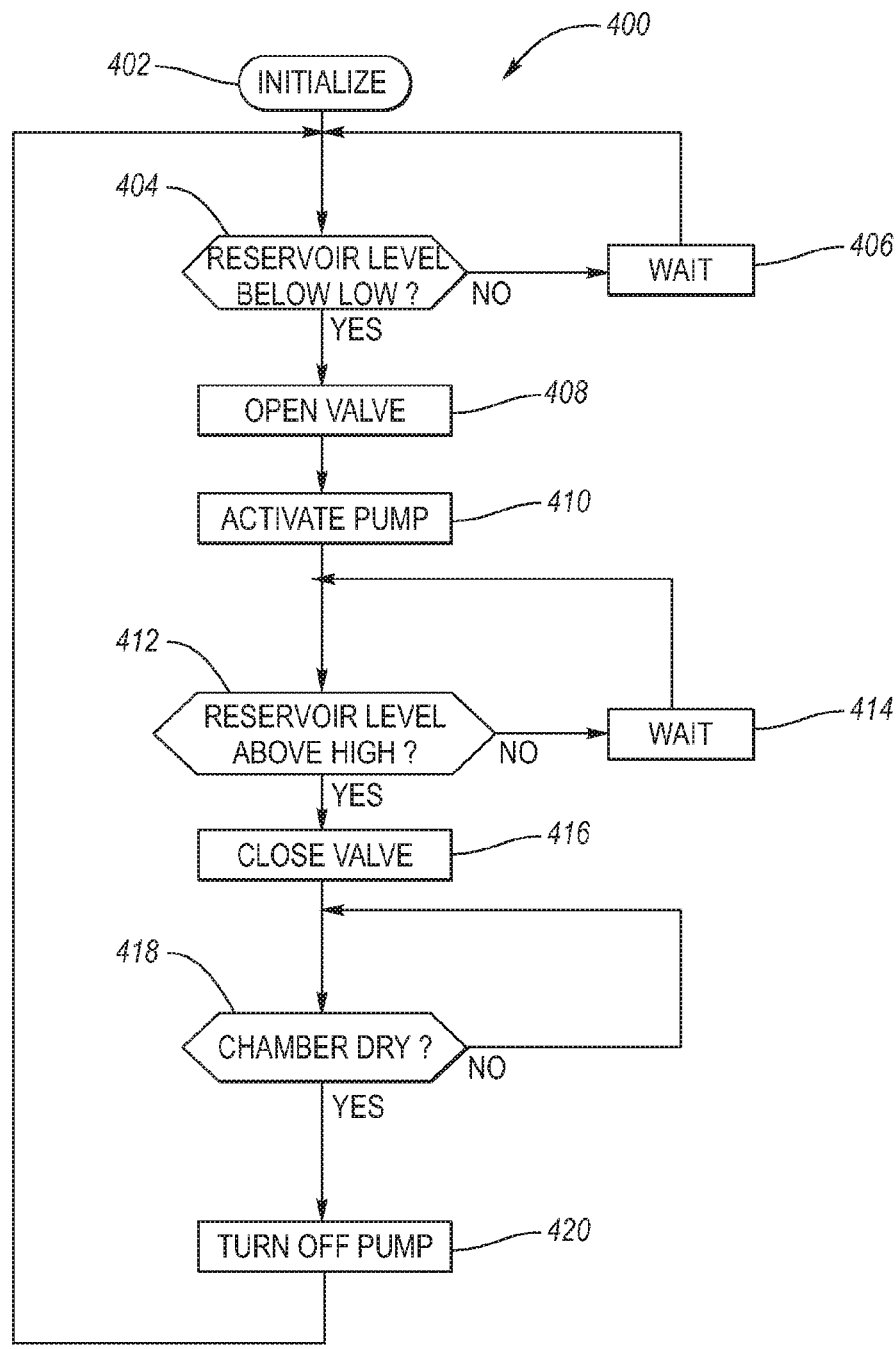

WASHER FLUID SYSTEM FOR FUEL CELL VEHICLES

TECHNICAL FIELD

The present invention relates to exterior glass surface washer fluid systems of motor vehicles, and more particularly to a washer fluid system of fuel cell-powered vehicles that blends the waste water produced by the fuel cell thereof with a washer fluid concentrate.

BACKGROUND OF THE INVENTION

A fuel cell is an electrochemical energy conversion device that converts energy from the chemical reaction of a fuel and an oxidant into electrical energy. Proton exchange membrane (PEM) fuel cells are the most commonly used for vehicular power plants. In these fuel cells, hydrogen rich gas ($H_2$) is supplied as fuel and oxygen gas ($O_2$) or air is supplied as the oxidant. In the subsequent oxidation-reduction reactions, the $H_2$ is oxidized and reacts with $O_2$ to form water and produce electricity for the operation of an electrical power plant of the vehicle. The stoichiometry of the chemical reactions is such that the amount of water produced is proportional to the power consumed by the vehicle. The operational characteristics of the PEM fuel cell require particular levels of humidity to be efficient. However, in any PEM fuel cell which produces the requisite power to operate a motor vehicle, water is produced far in excess of the amount required to maintain the proper humidity in the fuel cell. Much effort in the design of these cells has been spent in managing the waste water issue.

Due to the economics of motor vehicle energy consumption, much of the design process of motor vehicles has been dictated by reducing vehicle weight and the space of non-passenger areas. This lowers the energy consumption directly by the lowering of weight and indirectly by allowing for more flexibility in the design of aerodynamically important surfaces through minimizing volume requirements imposed on designs. This is particularly important in electrically powered vehicles in which it is more difficult to provide marginal increases in power. Any design changes which allow for reduction in weight or space of electrically powered vehicles would have greater impact on the operational cost when compared to similar changes in gasoline powered vehicles.

Washer fluid systems are necessary for the safe operation of motor vehicles yet place a burden on both weight and space in the present configuration of motor vehicles. The washer fluid mix presently employed in motor vehicles consists primarily of water with antifreeze and cleaning components such as alcohols, amines, and non-ionic detergents. Typically, this mix is stored in premium compartment space to facilitate the operator's ability to refill the storage containers when needed. This results in designs which place large heavy containers, which are primarily filled with water, in premium areas of vehicle space. A design strategy which would call for the storage of only the concentrate form of the washer fluid would radically reduce the space and weight required by the washer fluid system.

What remains needed in the art is to somehow utilize the waste water, produced in the operation of the fuel cell, to provide washer fluid.

SUMMARY OF THE INVENTION

The present invention is a washer fluid system for fuel cell vehicles which provides washer fluid by blending concentrated washer fluid with waste water produced in the operation of a fuel cell. The concentrated washer fluid may be stored in a container which may be placed at any location, including, for example, a non-premium location such as for example a frame rail, engine cradle rail, behind wheel-well housings, etc.

A first preferred embodiment of the present invention includes an electronic control module (ECM), a mixing pump and a concentrated washer fluid reservoir. The ECM integrates inputs through the vehicle wiper system and produces an output in the form of signals to the mixing pump. The mixing pump serves as the mechanical actuator of the washer fluid system, and automatically meters the appropriate ratio of concentrated washer fluid to water (i.e., 1:10), preferably by a dual chamber arrangement. The waste water from the fuel cell and the concentrated washer fluid are drawn from their respective sources and mixed, creating a mixed washer fluid having the proper ratio of water to washer fluid concentrate. Through these two principal components the operations of the present invention are initiated and controlled.

These components of the washer fluid system further include two primary interfaces. One interface is with the vehicle driver, consisting of an operational input through the wiper system to indicate a demand for mixed washer fluid. Additionally, the driver may be notified through an indicator when the concentrated washer fluid level is low, as well as providing a means for the driver to replenish the concentrated washer fluid reservoir. Additionally, the washer fluid system must interface with the fuel cell system to provide the required waste water. This would, for example, involve a valve or splitter which would serve as an actuator to divert the flow of the waste water from the normal disposal pathway designed into the fuel cell system to the washer fluid system.

In a second embodiment of the present invention, in addition to the above described components, a storage reservoir of mixed washer fluid is further included which is connected to the wiper system, wherein the mixed washer fluid is produced by the aforementioned mixing process, and wherein the ECM receives additional input from sensors detecting the fluid level in the storage reservoir.

Accordingly, it is an object of the present invention to provide a washer fluid system that collects waste water from a fuel cell and blends it with washer fluid concentrate to form mixed washer fluid on an as needed basis and/or to provide washer fluid for a storage reservoir.

This and additional objects, features and advantages of the present invention will become clearer from the following specification.

BRIEF DESCRIPTION OF THE DRAWINGS

FIG. 7 is a flow diagram for the logic for the principle algorithm of the electronic control module for the second preferred embodiment of the present invention

DESCRIPTION OF THE PREFERRED EMBODIMENT

Figure 1:
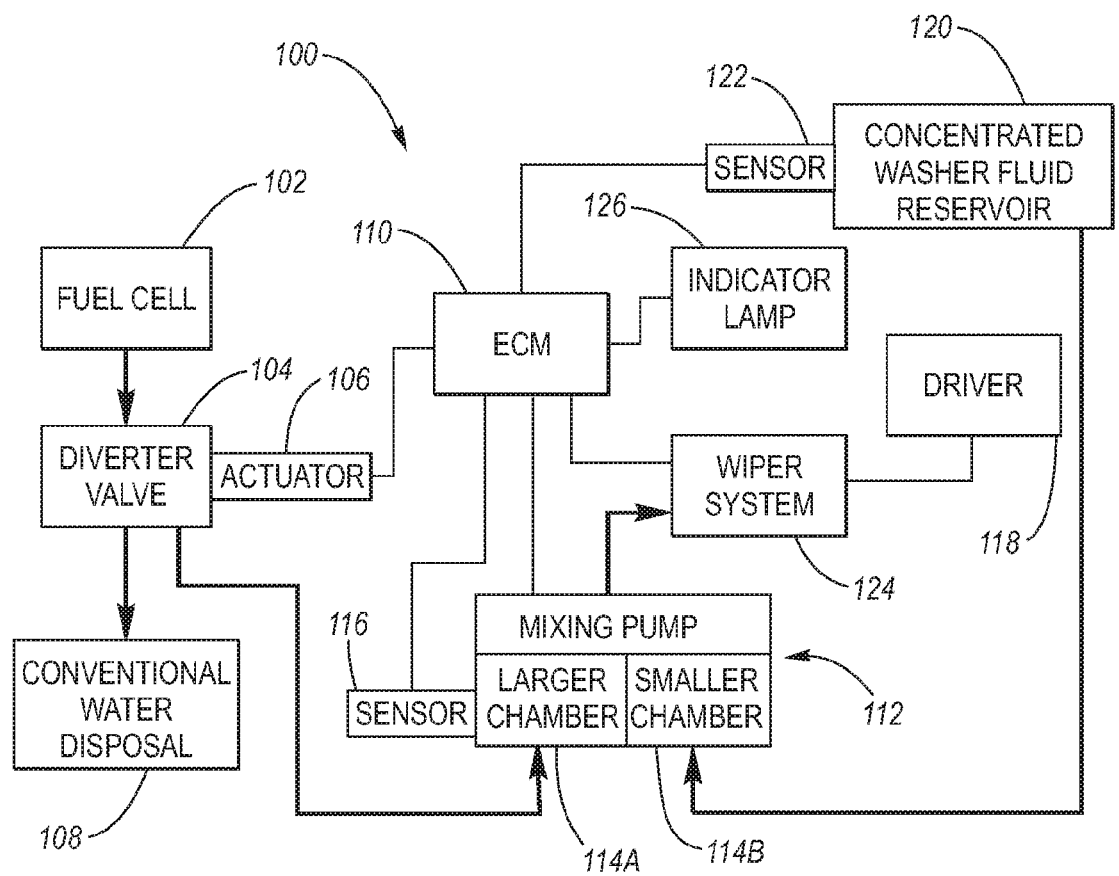
FIG. 1 is a schematic diagram of a first preferred embodiment of the present invention.
Figure 2:
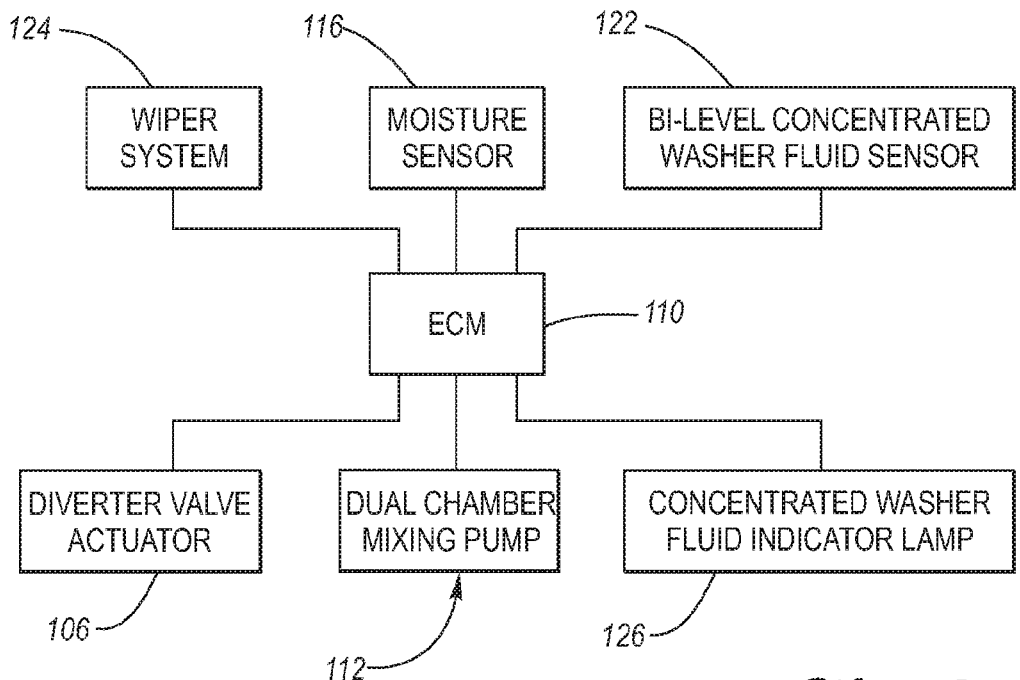
FIG. 2 is a schematic representation of a structural implementation of the controls for the first preferred embodiment of the present invention.
Figure 6:
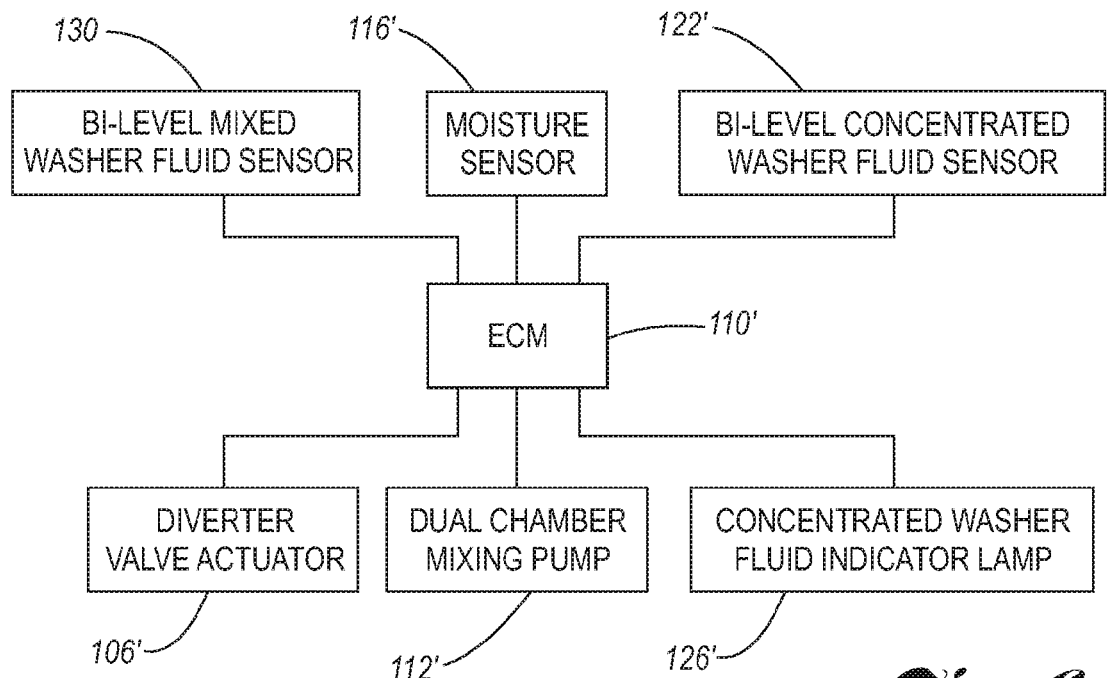
FIG. 6 is a schematic representation of a structural implementation of the controls for the second preferred embodiment of the present invention.
Figures 1A, 1B:
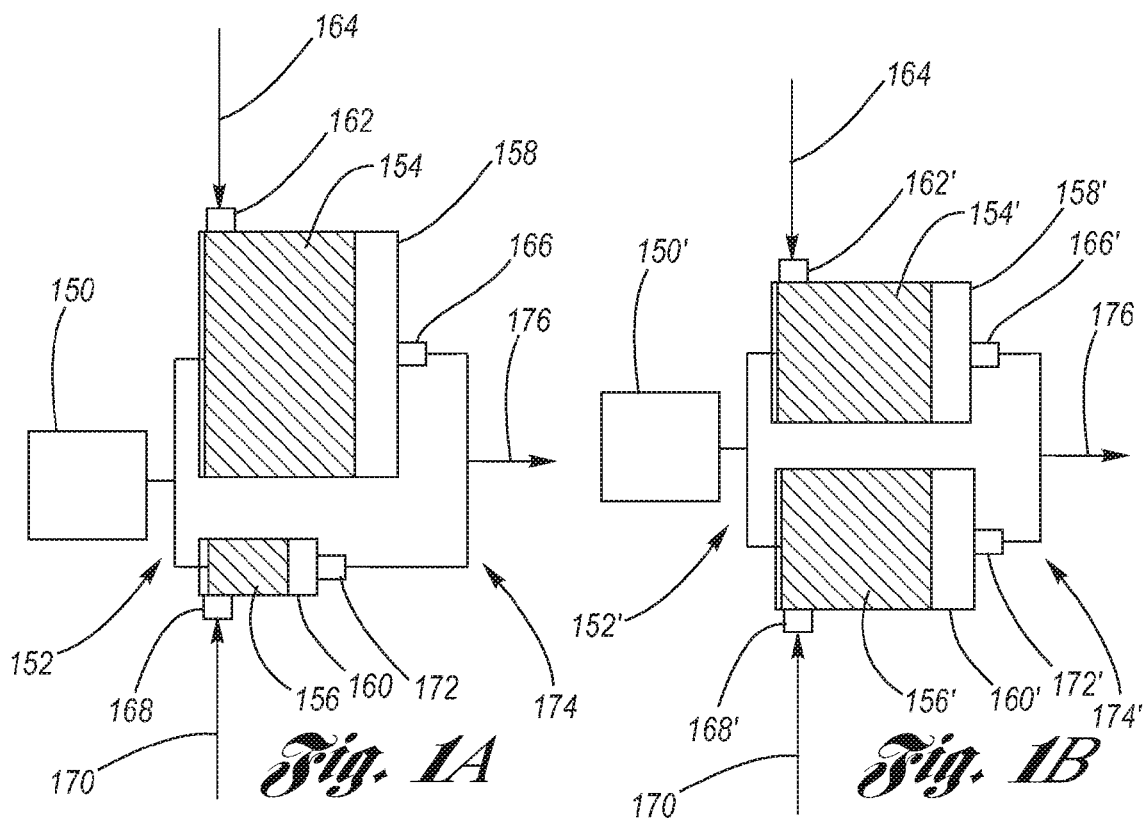
FIG. 1A is a schematic view of a first preferred embodiment of a mixing pump of the present invention.
FIG. 1B is a schematic view of a second preferred embodiment of a mixing pump of the present invention.
Figure 3:
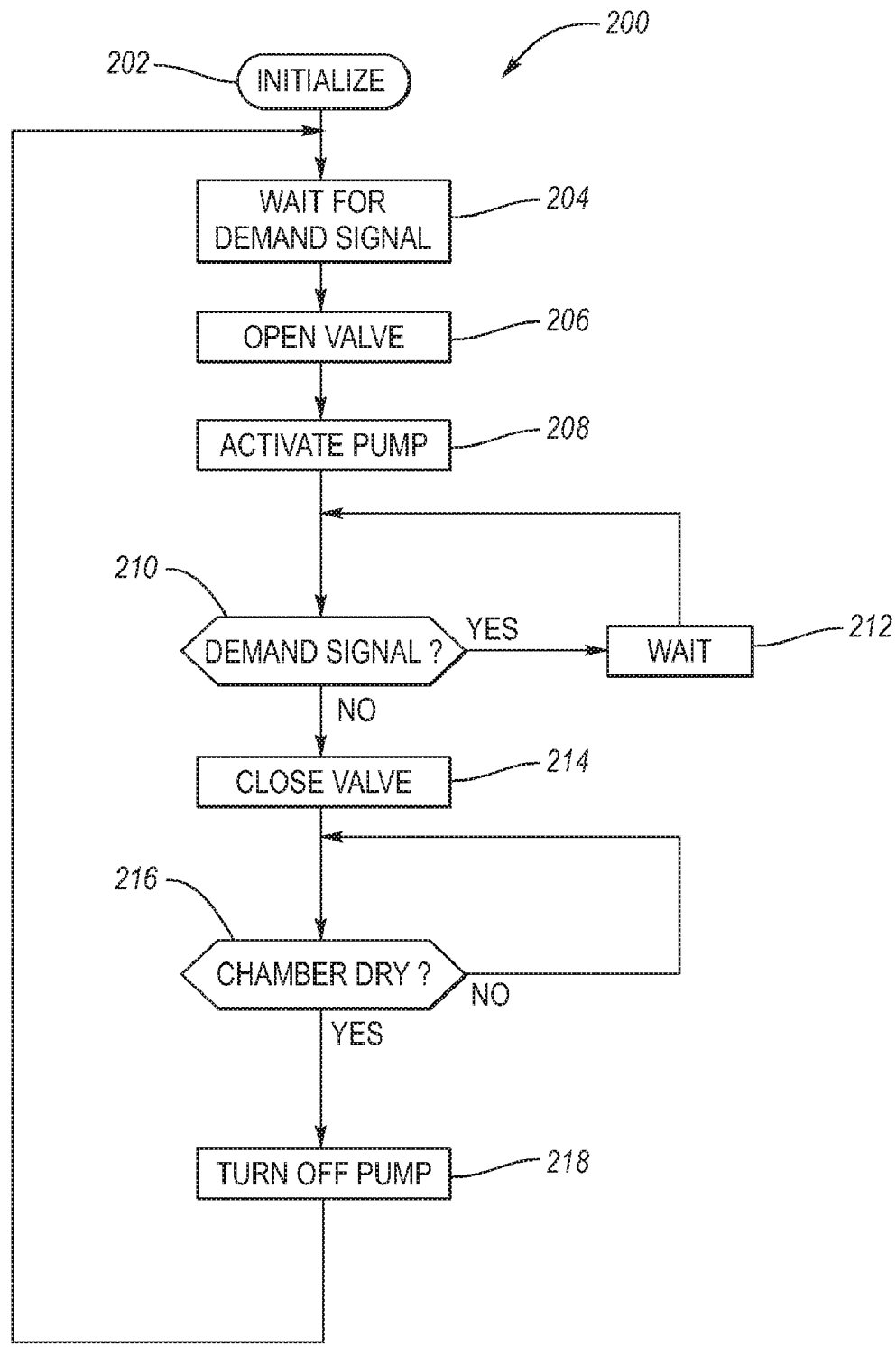
FIG. 3 is a flow diagram of the logic for the principle algorithm of the electronic control module for the first preferred embodiment of the present invention.
Figure 4:
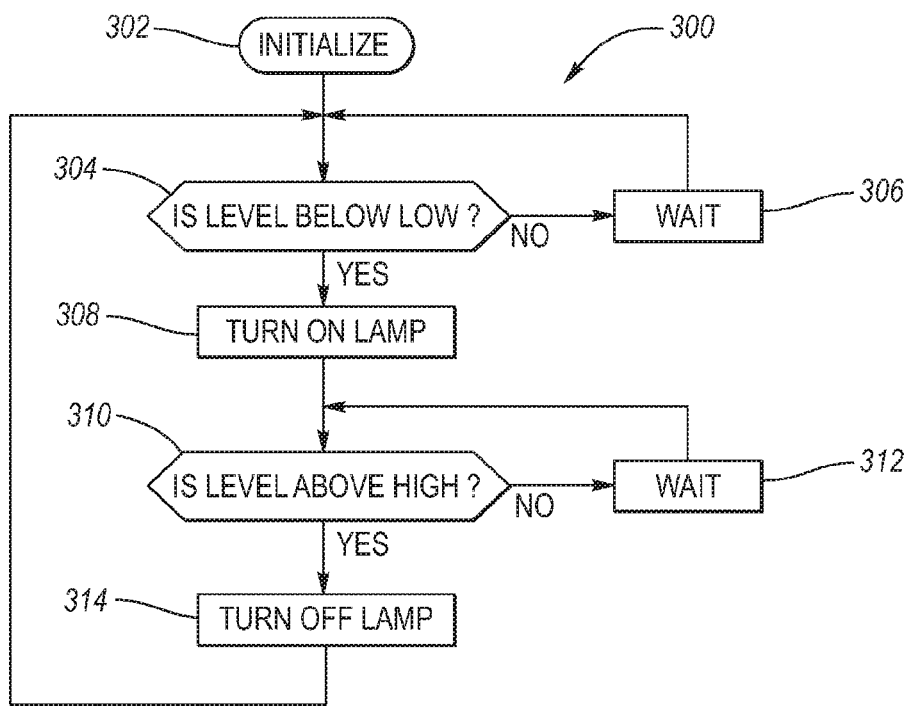
FIG. 4 is a flow diagram of the logic of the level control algorithm of the electronic control module for monitoring the level of the concentrated fluid level according to the present invention.
Figure 5:
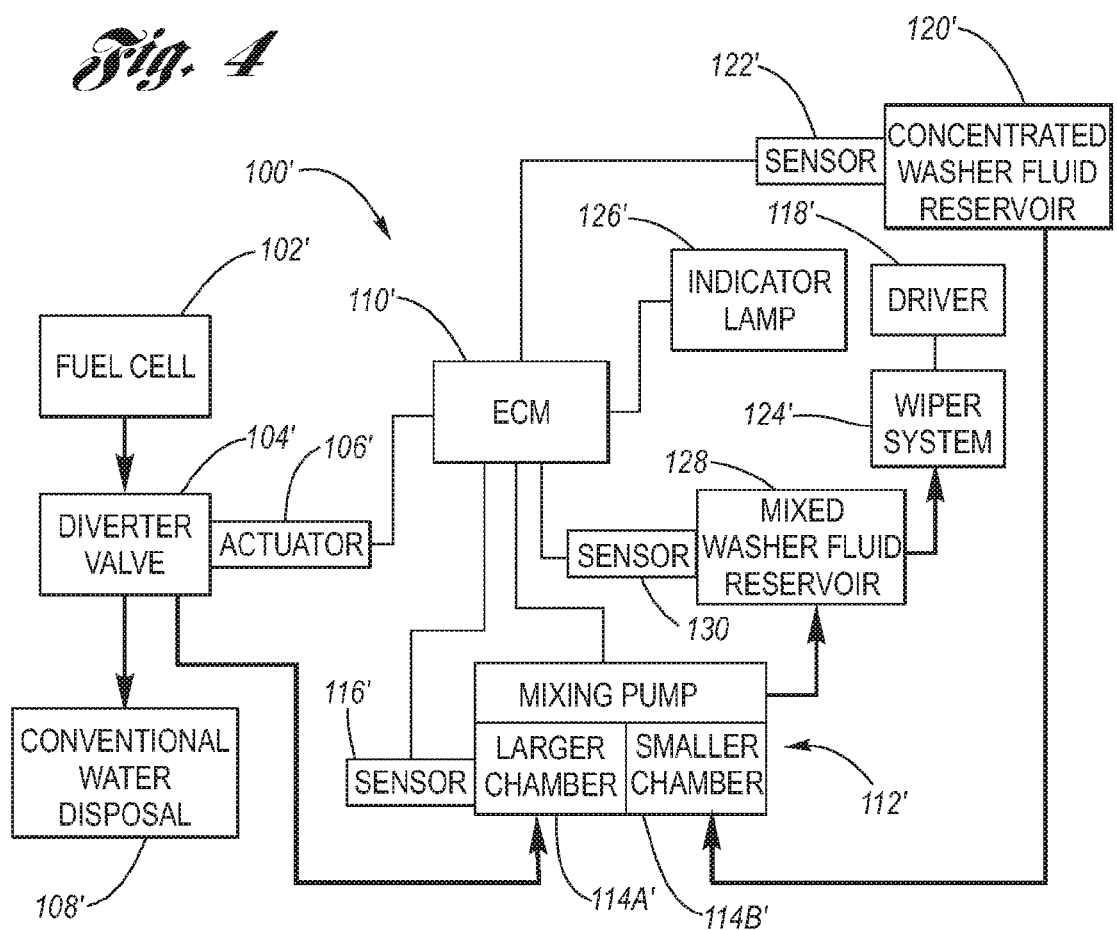
FIG. 5 is a schematic diagram of a second preferred embodiment of the present invention which contains a reservoir for mixed washer fluid.

Referring now to the Drawing, FIGS. 1, 2 and 3 depict a first preferred embodiment and FIGS. 5 through 7 depict a second preferred embodiment, wherein FIGS. 1A, 1B and 4 are shared therebetween, of a washer fluid system for fuel cell vehicles according to the present invention.

Referring firstly to FIGS. 1 through 2, the components of the first preferred embodiment of the washer fluid system 100 are depicted, wherein in FIG. 1 heavy lines with arrows demarcate fluid conduits and lighter lines demarcate intercommunication.

In a fuel cell-powered vehicle, a fuel cell 102 produces excess water in the course of its operation. According to the present invention, this excess water will pass through a diverter valve 104 which has two settings. The diverter valve 104 is interconnected with a diverter valve actuator 106. Under normal operating conditions, the diverter valve 104 is set to divert the water to a conventional modality of water disposal 108 as ordinarily designed into the fuel cell vehicle.

An electronic control module (ECM) 110, well known in the art, is in communication with, and activates components of, the washer fluid system 100 in order to control the operation thereof.

A concentrated washer fluid reservoir (or tank) 120 holds concentrated washer fluid. The concentrated washer fluid reservoir 120 may be placed in any convenient location, including a non-premium location of the vehicle, as for example a frame rail, engine cradle rail, behind a wheel well housing, etc. The concentrated washer fluid reservoir 120 is preferably equipped with a bi-level sensor 122 capable of detecting fluid levels below or above two separate levels, wherein such a bi-level sensor is well known in the art. A level indicator 126, as for example a lamp located in the instrument area of the vehicle, is in communication with the ECM 110 and is lit when the concentrated washer fluid reservoir 120 needs refilling.

A mixing pump 112 pumps two liquids (the water from the fuel cell 102 and the concentrated washer fluid from the concentrated washer fluid reservoir 120) and mixes them in a predetermined proportion, such as for example a 10 to 1 ratio of water to concentrated washer fluid. By way of preferred exemplification, a larger chamber 114A and a smaller chamber 114B are utilized, which are mutually scaled by relative volume to the precise ratio required for the mixing of water with concentrated washer fluid to thereby provide a mixed washer fluid for use by the wiper system 124.

A first example of the mixing pump (112 in FIG. 1 and 112' in FIG. 4) is depicted at FIG. 1A. A motor 150 has a 10 to 1 gear drive linkage 152 to the respective impellers 154, 156 of a larger chamber 158 and a smaller chamber 160. The larger chamber has an inlet 162 into which water 164 from the fuel cell enters, and an outlet 166. The smaller chamber has an inlet 168 into which concentrated washer fluid 170 of the concentrated washer fluid reservoir enters, and an outlet 172.

A mixing line 174 is connected to both outlets 166, 172 and provides a common line of mixed washer fluid 176 for use by the wiper system.

A second example of the mixing pump (112 in FIG. 1 and 112' in FIG. 4) is depicted at FIG. 1B. A motor 150' has a 10 to 1 gear drive linkage 152' to the respective impellers 154', 156' of equally sized first and second chambers 158', 160' such that the first chamber will pump liquid ten times the volume per unit time as that pumped by the second chamber. The first chamber has an inlet 162' into which water 164 from the fuel cell enters, and an outlet 166'. The second chamber has an inlet 168' into which concentrated washer fluid 170 of the concentrated washer fluid reservoir enters, and an outlet 172'. A mixing line 174' is connected to both outlets 164', 168' and provides a common line of mixed washer fluid 176 for use by the wiper system.

It will be understood that the mixing pump (112 in FIG. 1 and 112' in FIG. 4) may have other configurations whereby a fixed predetermined ratio of water from the fuel cell to concentrated washer fluid from the washer fluid reservoir is provided, as for example via metering orifices, electronic regulation of relative fluid flow rates from two separate pumps, etc.

A moisture sensor 116 is preferably contained within the larger chamber 114A and is in communication with the ECM 110. The purpose of the moisture sensor is to detect the presence of water in the larger chamber 114A, whereby it can be removed (discussed below) before freezing in cold weather (the smaller chamber has concentrated washer fluid therein which will is not subject to freezing). The moisture sensor 116 and operational aspects related thereto (discussed below) are obviated if the mixing pump 112 and its associated water inlet line are kept above freezing.

The wiper system 124 is conventional and well known in the art, consisting of at least one wiper and motor combination for wiping the external glass surfaces of the vehicle, a control interface so that the driver 118 may control its operation, and a means for pumping and spraying washer fluid onto the wiped glass.

Referring primarily now to FIG. 2, which is a schematic representation of a structural implementation of the controls, the driver 118 commands spray of mixed washer fluid by wiper system 124, whereupon the wiper system sends a signal to the ECM 110 that there is a demand for mixed washer fluid. The moisture sensor 116 sends signal to the ECM 110 indicating the presence, or lack of presence, of moisture in the larger chamber 114A of the mixing pump 112. The bi-level sensor 122 located in the concentrated washer fluid reservoir 120, provides information to the ECM 110 indicating the level of concentrated washer fluid in the concentrated washer fluid reservoir 120. The ECM 110 processes these inputs and, by means of operational algorithms (discussed below with respect to FIGS. 3 and 4), selectively outputs operational signals. In this regard, the ECM 110 has three channels of output data, namely: a signal to the diverter valve actuator 106, a signal to the mixing pump 112 and a signal to the level indicator lamp 126.

Referring next to FIG. 3, a principal algorithm 200 for programming the ECM 110 is shown. The program is initialized at Block 202. The program advances to Block 204, where it remains until a demand signal is received from the driver 118 via the wiper system 124, indicating there is a demand for mixed washer fluid. Upon receipt of the demand signal, the program advances to Block 206. At Block 206 the ECM 110 issues a signal to the diverter valve actuator 106, which thereupon sets the diverter valve 104 to divert water to the larger chamber 114A of the mixing pump 112. The program then advances to Block 208 whereat the mixing pump 112 is activated. The program now advances to decision Block 210 where inquiry is made whether the driver 118 is still demanding washer fluid through the wiper system 124. If the answer to the inquiry is yes, then the program advances to Block 212. At Block 212 a predetermined waiting period occurs before the program returns to Block 210; for example, this wait may be about two seconds and allows for a minimum time of spray. However, if the answer to the inquiry of Block 210 is no, then the program advances to Block 214. At Block 214 a signal is sent by the ECM 110 to the diverter valve actuator 106 to close the diverter valve 104. The program then advances to decision Block 216, where inquiry is made whether the moisture sensor 116 indicates the larger chamber 114A of the mixing pump 112 is still wet. If the answer to the inquiry is yes, then the pump remains running to pull air through the larger mixing chamber 114A of the mixing pump 112 in order to dry the larger chamber 114A and its related tubing. If the answer to the inquiry of Block 216 is no, then the larger chamber 114A is sufficiently dry, and the program advances to Block 218. At Block 218 the ECM 110 sends a signal to turn off the mixing pump 112 and the program returns to Block 204 to await a next demand signal from the wiper system 124.

Referring to FIG. 4, the algorithm for controlling the level of concentrated washer fluid 300 in the concentrated washer fluid reservoir 120 is depicted.

The program is initialized at Block 302. The program proceeds to decision Block 304, where inquiry is made whether the concentrated washer fluid level is below a first predetermined level. If the answer to the inquiry is no, then the program proceeds to Block 306 and waits for a predetermined duration, as for example one minute so that the lamp won't be subject to rapid toggling on and off when the fluid level is at the sensor level, before returning to Block 304. If the answer to the inquiry of Block 304 is yes, then the program advances to Block 308, whereat the indicator lamp 126 is lit, indicating to the driver there is a need to replenish concentrated washer fluid in the concentrated washer fluid reservoir 120. The program then proceeds to decision Block 310 where inquiry is made whether the concentrated washer fluid is above a second predetermined level, wherein the second predetermined level is higher than the first predetermined level. If the answer to the inquiry is no, then the program proceeds to Block 312 and waits for a predetermined interval before returning to Block 310, again for the purpose of preventing lamp toggling. If the answer to the inquiry of Block 310 is yes, then the program proceeds to Block 314. At Block 314 the indicator lamp 126 is turned off and the program returns to Block 304.

Referring now to FIGS. 5 and 6, depicted is a second preferred embodiment of the washer fluid system 100' according to the present invention, which now utilizes a storage reservoir (or tank) 128 for mixed washer fluid, wherein like parts to those described with respect to FIGS. 1 and 2 have like numbers with a prime, wherein the detailed description thereof need only be minimal in view of the detailed description hereinabove with respect to the first preferred embodiment, and wherein in FIG. 5, as in FIG. 1, heavy lines with arrows demarcate fluid conduits and lighter lines demarcate intercommunication.

FIG. 5 depicts a fuel cell-powered vehicle fuel cell 102' that produces excess water in the course of its operation, wherein this excess water passes through a diverter valve 104' which has two settings and is interconnected with a diverter valve actuator 106'. Under normal operating conditions, the diverter valve 104' is set to divert the water to a conventional modality of water disposal 108' as ordinarily designed into the fuel cell vehicle. An electronic control module (ECM) 110' is in communication with and activates components of the present invention in order to control the operation therein. A concentrated washer fluid reservoir 120' provides concentrated washer fluid, and may be placed in any convenient location as described above. The concentrated washer fluid reservoir 120' is preferably equipped with a bi-level sensor 122' capable of detecting fluid levels below or above two separate levels, as described above. A mixing pump 112' pumps two liquids (the water from the fuel cell 102' and the concentrated washer fluid from the concentrated washer fluid reservoir 120') and mixes them in a predetermined proportion, such as for example a 10 to 1 ratio of water to concentrated washer fluid. By way of preferred exemplification, a larger chamber 114A' and a smaller chamber 114B' are utilized which are mutually scaled by relative volume to the precise ratio required for the mixing of water with concentrated washer fluid to thereby provide a mixed washer fluid for use by the wiper system 124. The mixing pump 112' may be as described with respect to FIGS. 1A and 1B, or be otherwise configured, as mentioned above to provide a proper ratio of mixed liquids output. A moisture sensor 116' is optionally contained within the larger chamber 114A' and is in communication with the ECM 110'. The wiper system 124' is conventional, as described above. A level indicator 126', as for example a lamp, is located in the instrument area of the vehicle, wherein the lamp is in communication with the ECM 110' and is lit when the concentrated fluid reservoir 120' needs refilling.

The storage reservoir 128 is connected to the output of the mixing pump 112'. The storage reservoir 128 may be located at any convenient location, inside or outside of the engine compartment, and holds mixed washer fluid exiting the mixing pump 112', formed as described above, wherein the mixed washer fluid in the storage container is delivered to the wiper system 124' upon demand of the driver 118'. The storage reservoir 128 preferably contains a bi-level mixed washer fluid level sensor 130, which, as mentioned, is known in the art, and which is in communication with the ECM 110'.

Referring now particularly to FIG. 6, which is a schematic representation of a structural implementation of the controls, the mixed fluid level sensor 130' sends a signal to the ECM 110' upon the fluid level dropping below a predetermined threshold indicating a demand for mixed washer fluid. The moisture sensor 116' sends signal to the ECM 110' indicating the presence, or lack of presence, of moisture in the larger chamber 114A' of the mixing pump 112'. The bi-level sensor 122' located in the storage reservoir 120' provides a signal to the ECM 110' indicating the level of concentrated washer fluid therein. The ECM 110' processes these inputs and by means of operational algorithms (see FIG. 7), and selectively outputs operational signals. The ECM 110' has three channels of output data, namely a signal to the diverter valve controller 106', a signal to the mixing pump 112' and a signal to the level indicator lamp 126.

In this scheme of the second preferred embodiment, the ECM 110' has communication with the bi-level sensor 122' in the storage reservoir 120, and there is no need ECM communication with the wiper system 124' (as in FIG. 2), in that the wiper system draws mixed washer fluid from the mixed washer fluid reservoir, wherein no communication between the wiper system 124'.

Referring now to FIG. 7, the principal algorithm 400 for the ECM 110' is shown. The program is initialized at Block 402. The program advances to decision Block 404 where inquiry is made whether the washer fluid level in the mixed washer fluid reservoir 128' has dropped below a predetermined level. If the answer to the inquiry is no, then the program proceeds to Block 406 where the program waits for a predetermined amount of time (as for example one minute to prevent lamp toggling as discussed hereinabove) before returning to Block 404. If the answer to the inquiry of Block 404 is yes, the program proceeds to Block 408. At Block 408, the ECM 110' issues a signal to the diverter valve actuator 106', which thereupon sets the diverter valve 104' to divert water to the larger chamber 114A' of the mixing pump 112'. The program then advances to Block 410 whereat the mixing pump 112' is activated. The program now advances to decision Block 412 where inquiry is made whether the mixed washer fluid is above a predetermined level. If the answer to the inquiry is no, then the program proceeds to Block 414 and waits for a predetermined interval (i.e., one minute) before returning to Block 412. If the answer to the inquiry of Block 412 is yes, the program then advances to Block 416. At Block 416 a signal is sent by the ECM 110' to the diverter valve actuator 106' which causes closure of the diverter valve 104'. The program then advances to decision Block 418, where inquiry is made whether the moisture sensor 116' indicates the larger chamber 114A' of the mixing pump 112' is still wet. If the answer to the inquiry is yes, then the pump remains running to pull air through the larger mixing chamber 114A' of the mixing pump 112' in order to dry the larger chamber 114A' and its related tubing. If the answer to the inquiry is yes, the program advances to Block 420, whereat the program causes the ECM 110' to send signal to turn off the mixing pump 112' and the program returns to Block 404.

It is to be understood that the program described at FIG. 4 would be utilized to implement the bi-level concentrated washer fluid sensor 122' of FIG. 6.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A washer fluid system of a fuel cell vehicle, comprising:
a motor vehicle;
a wiper system disposed on board said vehicle;
a fuel cell disposed on board said vehicle, said fuel cell providing a source of water;
a concentrated washer fluid reservoir of concentrated washer fluid;
a mixing device disposed on board said vehicle, said mixing device mixing the water with the concentrated washer fluid in a predetermined ratio of relative volumes to thereby provide a mixed washer fluid to the wiper system; and
an electronic control module interfaced with said wiper system and said mixing device, wherein said electronic control module selectively operates said mixing device to thereby provide said wiper system with said mixed washer fluid upon request of said washer fluid system;
wherein said mixing device comprises a first chamber connected to the source of water; and
wherein said electronic control module operates said mixing device so that after providing said mixed washer fluid, said first chamber is emptied.

2. The system of claim 1, further comprising:
a diverter valve connected with said source of water, said diverter valve being switchable between a first position whereat the water goes to a predetermined water disposal and a second position whereat the water at least in part goes to said first chamber; and
an actuator connected to said diverter valve which selectively switches said diverter valve between said first and second positions;
wherein said electronic control module is further interfaced with said actuator, wherein said electronic control module selectively operates said mixing device and said actuator to thereby provide said wiper system with said mixed washer fluid upon request of said washer fluid system.

3. The system of claim 2, further comprising:
a level sensor sensing at least one level of the concentrated washer fluid in the concentrated washer fluid reservoir; and
an indicator indicative of a low level of the concentrated washer fluid responsive to the at least one level sensed by said level sensor.

4. The system of claim 1, wherein said mixing device comprises:
a mixing pump comprising:
said first chamber having a first output;
a second chamber connected to the concentrated washer fluid reservoir, said second chamber having a second output; and
an interconnection of said first and second outputs to provide a mixed output;
wherein said first and second chambers are operatively coordinated such that said mixed output provides said predetermined ratio.

5. The system of claim 4, further comprising:
a diverter valve connected with said source of water, said diverter valve being switchable between a first position whereat the water goes to a predetermined water disposal and a second position whereat the water at least in part goes to said first chamber; and
an actuator connected to said diverter valve which selectively switches said diverter valve between said first and second positions;
wherein said electronic control module is further interfaced with said actuator, wherein said electronic control module selectively operates said mixing pump and said actuator to thereby provide said wiper system with said mixed washer fluid upon request of said washer fluid system.

6. The system of claim 4, further comprising:
a level sensor sensing at least one level of the concentrated washer fluid in the concentrated washer fluid reservoir; and
an indicator indicative of a low level of the concentrated washer fluid responsive to the at least one level sensed by said level sensor.

7. The system of claim 6, further comprising:
a diverter valve connected with said source of water, said diverter valve being switchable between a first position whereat the water goes to a predetermined water disposal and a second position whereat the water at least in part goes to said first chamber; and
an actuator connected to said diverter valve which selectively switches said diverter valve between said first and second positions;
wherein said electronic control module is further interfaced with said actuator, wherein said electronic control module selectively operates said mixing pump and said actuator to thereby provide said wiper system with said mixed washer fluid upon request of said washer fluid system.

8. A washer fluid system of a fuel cell vehicle, comprising:
a motor vehicle;
a wiper system disposed on board said vehicle;
a fuel cell disposed on board said vehicle, said fuel cell providing a source of water;
a concentrated washer fluid reservoir of concentrated washer fluid disposed on board said vehicle;
a storage reservoir connected to said wiper system;
a mixing device disposed on board said vehicle, said mixing device mixing the water with the concentrated washer fluid in a predetermined ratio of relative volumes to thereby provide a mixed washer fluid in the storage reservoir which is available to said wiper system; and
an electronic control module interfaced with said wiper system and said mixing device, wherein said electronic control module selectively operates said mixing device to thereby provide said wiper system with said mixed washer fluid upon request of said washer fluid system;
wherein said mixing device comprises a first chamber connected to the source of water; and
wherein said electronic control module operates said mixing device so that after providing said mixed washer fluid, said first chamber is emptied.

9. The system of claim 8, further comprising:
a diverter valve connected with said source of water, said diverter valve being switchable between a first position whereat the water goes to a predetermined water disposal and a second position whereat the water at least in part goes to said first chamber;
an actuator connected to said diverter valve which selectively switches said diverter valve between said first and second positions; and
a mixed washer fluid level sensor sensing at least one level of the mixed washer fluid in the storage reservoir;
wherein said electronic control module is further interfaced with said actuator, wherein said electronic control module selectively operates said mixing device and said actuator to thereby provide said storage reservoir with additional mixed washer fluid in response to said mixed washer fluid level indicator sensing the mixed washer fluid is below a predetermined level.

10. The system of claim 9, further comprising:
a concentrated washer fluid level sensor sensing at least one level of the concentrated washer fluid in the concentrated washer fluid reservoir; and
an indicator indicative of a low level of the concentrated washer fluid responsive to the at least one level sensed by said concentrated washer fluid level sensor.

11. The system of claim 8, wherein said mixing device comprises a mixing pump comprising:
said first chamber having a first output;
a second chamber connected to the concentrated washer fluid reservoir, said second chamber having a second output; and
an interconnection of said first and second outputs to provide a mixed output;
wherein said first and second chambers are operatively coordinated such that said mixed output provides said predetermined ratio.

12. The system of claim 11, further comprising:
a diverter valve connected with said source of water, said diverter valve being switchable between a first position whereat the water goes to a predetermined water disposal and a second position whereat the water at least in part goes to said first chamber;
an actuator connected to said diverter valve which selectively switches said diverter valve between said first and second positions; and
a mixed washer fluid level sensor sensing at least one level of the mixed washer fluid in the storage reservoir;
wherein said electronic control module is further interfaced with said actuator, wherein said electronic control module selectively operates said mixing device and said actuator to thereby provide said storage reservoir with additional mixed washer fluid in response to said mixed washer fluid level indicator sensing the mixed washer fluid is below a predetermined level.

13. The system of claim 11, further comprising:
a concentrated washer fluid level sensor sensing at least one level of the concentrated washer fluid in the concentrated washer fluid reservoir; and
an indicator indicative of a low level of the concentrated washer fluid responsive to the at least one level sensed by said concentrated washer fluid level sensor.

14. The system of claim 13, further comprising:
a diverter valve connected with said source of water, said diverter valve being switchable between a first position whereat the water goes to a predetermined water disposal and a second position whereat the water at least in part goes to said first chamber;
an actuator connected to said diverter valve which selectively switches said diverter valve between said first and second positions; and
a mixed washer fluid level sensor sensing at least one level of the mixed washer fluid in the storage reservoir;
wherein said electronic control module is further interfaced with said actuator, wherein said electronic control module selectively operates said mixing device and said actuator to thereby provide said storage reservoir with additional mixed washer fluid in response to said mixed washer fluid level indicator sensing the mixed washer fluid is below a predetermined level.

* * * * *